United States Patent
Kose et al.

(10) Patent No.: US 10,691,836 B2
(45) Date of Patent: Jun. 23, 2020

(54) SYSTEM AND METHOD FOR SWITCHED-CAPACITOR BASED SIDE-CHANNEL COUNTERMEASURES

(71) Applicants: Selcuk Kose, Tampa, FL (US); Weize Yu, Tampa, FL (US)

(72) Inventors: Selcuk Kose, Tampa, FL (US); Weize Yu, Tampa, FL (US)

(73) Assignee: University of South Florida, Tampa, FL (US)

(*) Notice: Subject to any disclaimer, the term of this patent is extended or adjusted under 35 U.S.C. 154(b) by 292 days.

(21) Appl. No.: 15/967,044

(22) Filed: Apr. 30, 2018

(65) Prior Publication Data

US 2018/0314860 A1 Nov. 1, 2018

Related U.S. Application Data

(60) Provisional application No. 62/491,343, filed on Apr. 28, 2017.

(51) Int. Cl.
*G06F 21/75* (2013.01)
*H04L 9/00* (2006.01)
(Continued)

(52) U.S. Cl.
CPC .......... *G06F 21/755* (2017.08); *G06F 21/556* (2013.01); *G06F 21/81* (2013.01); *H02M 3/07* (2013.01); *H04L 9/003* (2013.01); *H04L 9/0662* (2013.01); *H04L 9/12* (2013.01); *G06F 7/582* (2013.01)

(58) Field of Classification Search
CPC .................................................. G06F 21/755
See application file for complete search history.

(56) References Cited

U.S. PATENT DOCUMENTS

| 5,926,513 A | * | 7/1999 | Suominen | H03J 3/08 375/346 |
| 9,748,837 B1 | * | 8/2017 | Kose | H02M 3/07 |
| 2015/0245148 A1 | * | 8/2015 | Rasmussen | H04R 25/602 381/315 |

OTHER PUBLICATIONS

Ahmad et al., "Low-power compact composite field AES S-Box/Inv S-Box design in 65 nm CMOS using novel XOR gate," Integr. VLSI J., 2013, 46(4): 333-344.

(Continued)

*Primary Examiner* — Simon P Kanaan
(74) *Attorney, Agent, or Firm* — Thomas | Horstemeyer, LLP (57) ABSTRACT

Methods and systems are provided for a charge withholding converter reshuffling technique that decorrelates input power of a multi-phase switched capacitor (SC) voltage converter relative to the output power provided to a load. The load may be a cryptographic device. The technique provides a countermeasure against power analysis attacks. A controller including a first random number generator coupled to the stages of the SC voltage converter controls gating for charging a first subset of the stages. A controller including a second random number generator coupled the stages of the SC voltage converter controls gating for discharging a second subset the stages. A number of the switched capacitor stages maintain their charge beyond the switch period in which they are charged. The SC voltage converter withholds a random portion of input charge and delivers this charge to the load after a random time period.

20 Claims, 9 Drawing Sheets

(51) Int. Cl.
         H02M 3/07      (2006.01)
         G06F 21/81     (2013.01)
         G06F 21/55     (2013.01)
         H04L 9/12      (2006.01)
         H04L 9/06      (2006.01)
         G06F 7/58      (2006.01)

(56) References Cited

OTHER PUBLICATIONS

Alioto et al., "Effectiveness of leakage power analysis attacks on DPA-resistant logic styles under process variations", IEEE Trans. Circuits Syst. I Reg. Papers, 2014, 61(2): 429-442.

Alioto et al., "Leakage power analysis attacks: A novel class of attacks to nanometer cryptographic circuits," IEEE Transactions on Circuits and Systems I: Regular Papers, 2010, 57(2): 355-367.

Andersen et al., "A 4.6 W/mm 2 power density 86% efficiency on-chip switched capacitor DC-DC converter in 32 nm SOI CMOS," Proc. Appl. Power Electron. Conf. Expo. (APEC), 2013, pp. 692-699.

Avirneni et al., "Countering power analysis attacks using reliable and aggressive designs," IEEE Transactions on Computers, 2014, 63(6): 1408-1420.

Baddam et al., "Evaluation of dynamic voltage and frequency scaling as a differential power analysis countermeasure," Proc. 20th Int. Conj VLSI Des., 2007, pp. 854-862.

Jeon, "Fully integrated on-chip switched capacitor DC-DC converters for battery-powered mixed-signal SoCs," Ph.D. dissertation, Dept. Electr. Comput. Eng., Northeastern Univ., Boston, MA, USA, Oct. 2012.

Kar et al., "Exploiting fully integrated inductive voltage regulators to improve side channel resistance of encryption engines," Proc. ISLPED, 2016, pp. 130-135.

Kopf et al., "An information-theoretic model for adaptive side-channel attacks," Proc. CCS, 2007, pp. 286-296.

Kopf et al., "Vulnerability bounds and leakage resilience of blinded cryptography under timing attacks," Proc. IEEE CSF, 2010, pp. 44-56.

Maghrebi et al., "Entropy-based power attack," Proc. IEEE Int. Symp. HOST, pp. 1-6.

Moradi, "Side-channel leakage through static power-should we care about in practice?," Springer Cryptographic Hardware and Embedded Systems, 2014, pp. 562-579.

Pozo et al., "Side-channel attacks from static power: When should we care?," Proc. Design, Autolllation and Test in Europe (DATE), 2015, pp. 145-150.

Ramadass et al., "A fully-integrated switched-capacitor step-down dc-dc converter with digital capacitance modulation in 45 nm CMOS," IEEE J. Solid-State Circuits, 2010, 45(12): 2557-2565.

Seeman, "A design methodology for switched-capacitor DC-DC converters," Ph.D. dissertation, Electr. Eng. Comput. Sci., Univ. California Berkeley, Berkeley, CA, USA, May 2009.

Standaert et al., "An overview of power analysis attacks against field programmable gate arrays," Proc. IEEE, 2006, 94(2): 383-394.

Tokunaga et al., "Securing encryption systems with a switched capacitor current equalizer," IEEE J. Solid-State Circuits, 2010, 45(1): 23-31.

Uzun et al., "Converter-gating: A power efficient and secure on-chip power delivery system," IEEE J. Emerging Sel. Topics Circuits Syst., 2014, 4(2): 169-179.

Yu et al., "A voltage regulator-assisted lightweight AES implementation against DPA attacks," IEEE Transactions on Circuits and Systems I: Regular Papers, 2016, 63(8): 1152-1163.

Yu et al., "Charge-Withheld Converter-Reshuffling: A Countermeasure Against Power Analysis Attacks," in IEEE Transactions on Circuits and Systems II: Express Briefs, 2016, 63(5): 438-442.

Yu et al., "Exploiting voltage regulators to enhance various power attack countermeasures," IEEE Transactions on Emerging Topics in Computing, 2016, 6(2): 244-257.

Yu et al., "False Key-Controlled Aggressive Voltage Scaling: A Countermeasure Against LPA Attacks," IEEE Transactions on Computer-Aided Design of Integrated Circuits and Systems, 2017, 36(12): 2149-2153.

Yu et al., "Leveraging on-chip voltage regulators as a countermeasure against side-channel attacks," Proc. IEEE DAC, 2015, pp. 1-6.

Yu et al., "Security-Adaptive Voltage Conversion as a Lightweight Countermeasure Against LPA Attacks," IEEE Transactions on Very Large Scale Integration (VLSI) Systems, 2017, 25(7): 2183-2187.

Yu et al., "Time-delayed converter-reshuffling: An efficient and secure power delivery architecture," IEEE Embedded Syst. Lett., 2015, 7(3): 73-76.

Zhu et al., "Employing symmetric dual-rail logic to thwart LPA Attack," IEEE Embedded Systems Letters, 2013, 5(4): 61-64.

\* cited by examiner

SYSTEM AND METHOD FOR SWITCHED-CAPACITOR BASED SIDE-CHANNEL COUNTERMEASURES

CROSS-REFERENCE TO RELATED APPLICATION(S)

This application claims the benefit of priority to U.S. Provisional Patent Application No. 62/491,343, which was filed on Apr. 28, 2017, the entire contents of which are incorporated herein by reference in its entirety.

STATEMENT REGARDING FEDERALLY SPONSORED RESEARCH OR DEVELOPMENT

This invention was made with government support CCF1350451 awarded by the National Science Foundation. The Government has certain rights in the invention.

TECHNICAL FIELD

The invention relates to systems and methods for charge-withheld converter-reshuffling as a countermeasure against differential power analysis (DPA) attacks. More specifically, the invention relates to withholding a random amount of charge for a random time period in a voltage converter reshuffling system.

BACKGROUND OF THE INVENTION

Differential power analysis (DPA) attacks can obtain the secret key in a cryptographic device within feasible time and at a reasonable cost. In order to protect cryptographic devices from DPA attacks, various techniques have been proposed as a countermeasure. All existing countermeasures, however, consume a significant amount of dynamic power to hide or mask the load power information.

Converter-reshuffling (CoRe) technique has recently been proposed as a power-efficient countermeasure against differential power analysis (DPA) attacks by randomly reshuffling the individual stages within a multiphase switched-capacitor voltage converter. This randomized reshuffling of the converter stages inserts noise to the monitored power profile and prevents an attacker from extracting the correct input power data. The total number of activated phases within a switch period, however, still correlates with the dynamic power consumption of the workload. To break the one-to-one relationship between the monitored and actual power consumption, a charge-withheld CoRe technique is proposed in this brief by utilizing the flying capacitors to withhold a random amount of charge for a random time period.

The number of required converter stages is determined based on the workload information, whereas the activation pattern of these stages is determined by a pseudorandom number generator (PRNG) to scramble the input power profile of the voltage converter. As a result, an attacker is unable to synchronize the sampling frequency of the leakage data that are sampled by the attacker. Alternatively, if the attacker is able to synchronize the attack with the switching frequency of the on-chip voltage converter by using machine-learning (ML) attacks, the scrambled power data can be unscrambled by the attacker, and the CoRe technique may effectively be neutralized. The reason is that the total number of activated phases within a switch period has a high correlation with the load power dissipation.

SUMMARY OF THE INVENTION

Therefore, a charge-withheld CoRe technique is described to prevent the attacker from acquiring accurate load power information, even if the attacker can synchronize the data sampling. As compared to the conventional CoRe technique, the proposed charge-withheld CoRe technique eliminates the possibility of having a zero power trace entropy (PTE) even under machine-learning-based DPA attacks. The average PTE of the monitored power profile is increased ~46.1% with a 64-phase charge-withheld CoRe technique.

In some embodiments, a system for decorrelating input power of a voltage converter and output power provided to a load includes an N stage switched capacitor voltage converter that receives input power from a power supply and provides output power to a load. The system further includes a charging controller comprising a first N bit pseudorandom number generator. Each output of the first N bit pseudorandom number generator is coupled to a respective input of the N stage switched capacitor converter via one of N respective time delay components. The charging controller further comprises an electronic processor, and a memory storing instructions that when executed by the electronic processor cause the charging controller to transmit signals to the N stage switched capacitor converter for gating charging of a first subset of stages of the N stage switched capacitor converter. A discharging controller includes a second N bit pseudorandom number generator. Each output of the second N bit pseudorandom number generator is coupled to a respective one of a second N inputs of the N stage switched capacitor converter via a respective one of a second N time delay components. The discharging controller further comprises an electronic processor and a memory storing instructions that when executed by the electronic processor cause the discharging controller to transmit signals to the second N inputs of the N stage switched capacitor converter for gating discharging of a second subset the stages of the N stage switched capacitor converter.

In some embodiments, a method for decorrelating input power of a voltage converter and output power provided to a load includes receiving input power by an N stage switched capacitor voltage converter from a power supply and providing output power to a load. Charging of a first subset of stages of the N stage switched capacitor voltage converter is gated by a charging controller comprising a first N bit pseudorandom number generator. Each output of the first N bit pseudorandom number generator is coupled to one of N respective inputs of the N stage switched capacitor converter via one of N respective time delay components. Discharging of a second subset of the stages of the N switched capacitor voltage converter is gated by a discharging controller comprising a second N bit pseudorandom number generator. Each output of the second N bit pseudorandom number generator is coupled to a respective one of a second N inputs of the N stage switched capacitor converter via a respective one of a second N time delay components.

In some embodiments, a system for decorrelating input power of a voltage converter and output power provided to a load includes a switched capacitor voltage converter that receives input power from a power supply and provides power to a load. A charging controller controls gating of input power to charge a first subset of stages of the switched capacitor voltage converter during a switch period. A discharging controller controls gating to discharge power from a second subset of stages of the switched capacitor voltage converter during the switch period. The number of the first subset of the switched capacitor stages that are charged within the switch period and the number of the second subset of the switched capacitor stages that are discharged within the switch period are different.

Other aspects of the invention will become apparent by consideration of the detailed description and accompanying drawings.

DETAILED DESCRIPTION

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

It should also be noted that a plurality of hardware and software based devices, as well as a plurality of different structural components may be used to implement the embodiments set forth herein. In addition, it should be understood that embodiments may include hardware, software, and electronic components that, for purposes of discussion, may be illustrated and described as if the majority of the components were implemented solely in hardware. However, one of ordinary skill in the art, and based on a reading of this detailed description, would recognize that, in at least one embodiment, the electronic-based aspects of the embodiments may be implemented in software (e.g., stored on non-transitory computer-readable medium) executable by one or more electronic processors.

Differential power analysis (DPA) attacks may be utilized to obtain a secret key from a cryptographic device by observing input power to the device (the load). The DPA attacks may succeed within a feasible amount of time and at a reasonable cost. Various techniques have been attempted to work as a countermeasure against the DPA attacks. However, the existing countermeasures consume significant amounts of dynamic power in order to hide or mask the load power information.

Figure 1:
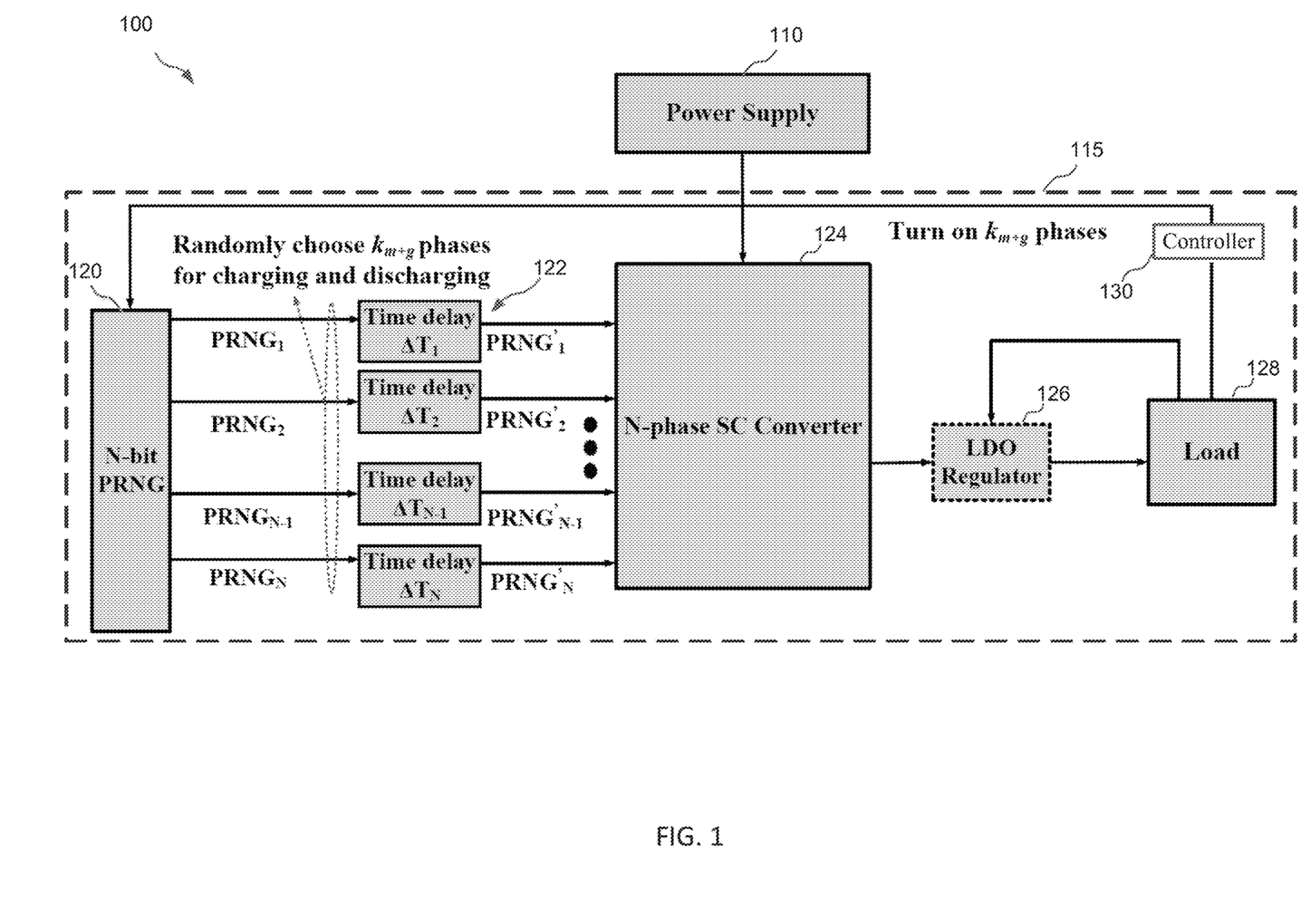
FIG. 1 illustrates example architecture for implementing a converter reshuffling (CoRe) technique, according to some embodiments.

FIG. 1 illustrates architecture for implementing a converter reshuffling (CoRe) technique as a DPA countermeasure according to an embodiment of the present invention. With reference to FIG. 1, a converter reshuffling (CoRe) system 100 includes a power supply 110, a monitored system 115, an N-bit pseudo-random number generator (PRNG) 120, N time delays 122, an N-phase switched capacitor (SC) voltage converter 124 (also referred to as SC converter), a low dropout (LDO) regulator 126, a load 128, and a controller 130. In some embodiments, all or a portion of the elements of the monitored system 115 comprise a system on a chip. The system 100 may comprise additional components not specifically discussed herein.

The N-bit PRNG 120 is operable to generate a sequence of numbers or a sequence of N bit output patterns that approximate the properties of a sequence of random numbers. N outputs of the N-bit PRNG 120 are coupled to N gating inputs of the SC converter 124 via the N respective time delays 122.

The N-phase SC converter 124 is a voltage converter that includes N stages of switched capacitor circuits that may be identical. The N-phase SC converter 124 may be referred to as an N-phase or an N-stage SC converter. Charges are moved into and out of the switched capacitor circuits when specified charging and discharging switches of the circuits are opened and closed according to gating and/or clock input signals. The various stages of the SC converter 124 may be clocked at different phase delays over a switch period, as indicated by the N time delays 122.

The SC converter 124 receives power from the power supply 110 and outputs power to the load 128 via the optional LDO regulator 126. The amount of power drawn from the power supply 110 depends on a demand for power consumption by the load 128. The load 128 may be a cryptographic circuit that may utilize a secret key to encrypt or decrypt data, such as a password or other data. An attacker may observe power input to the monitored system 115 (or into the SC converter 124) to determine data (such as the secret key) and/or operations performed by the load 128. In some embodiments, the monitored system 115 is a black box relative to the attacker's observations, which may be tamper resistant. In some embodiments, the monitored system 115 may include a smart card or an integrated circuit.

The controller 130 is connected to the load 128 and the N-bit PRNG 120. The controller 130 utilizes the load's demand for power to control the N-bit PRNG 120. In some embodiments, the controller 130 may include the N-bit PRNG 120. The controller 130 includes suitable logic, circuitry, interfaces, and/or or code that are operable to determine how many stages of the SC converter 124 that need to be activated (charged and/or discharged) to provide enough power to the load 128 to meet the demand for power. The controller 130 communicates the number of stages to the N-bit PRNG 120, which generates a random pattern of output signals for gating the SC converter 124 such that SC converter 124 charges and discharges the correct number of stages to provide power to the load 128 in accordance with the demand. Each signal in the random pattern of outputs from the N-PRNG 120 that is sent to a respective stage in the SC converter 124 is time delayed a portion of a switch period such that all of the outputs are clocked into SC converter 124 within a switch period. In some embodiments, the controller 130 includes an electronic processor and a memory that stores instructions, that when executed by the electronic processor, cause the controller 130 to perform the functions described herein.

In a CoRe technique, the activation/deactivation pattern of a multi-phase SC voltage converter 124 is controlled by the N-bit PRNG 120, as shown in FIG. 1. The PRNG 120 produces an N-bit random sequence $PRNG_i$; (i=1, 2, ..., N) that is delayed by $\Delta T_i$ to get synchronized with the clock signal $CLK_i$ generated by a phase shifter. The time delay $\Delta T_i$ is $$\Delta T_i = \frac{i}{N} T_s \quad (1)$$

where $T_s=1/f_s$ is the switch period. The optional low dropout (LDO) regulator 126 can be utilized at the output of the CoRe technique system before the load 128 when the number of phases N in the SC converter 124 is not sufficient to meet the accuracy requirement of the load 128.

Figure 2:
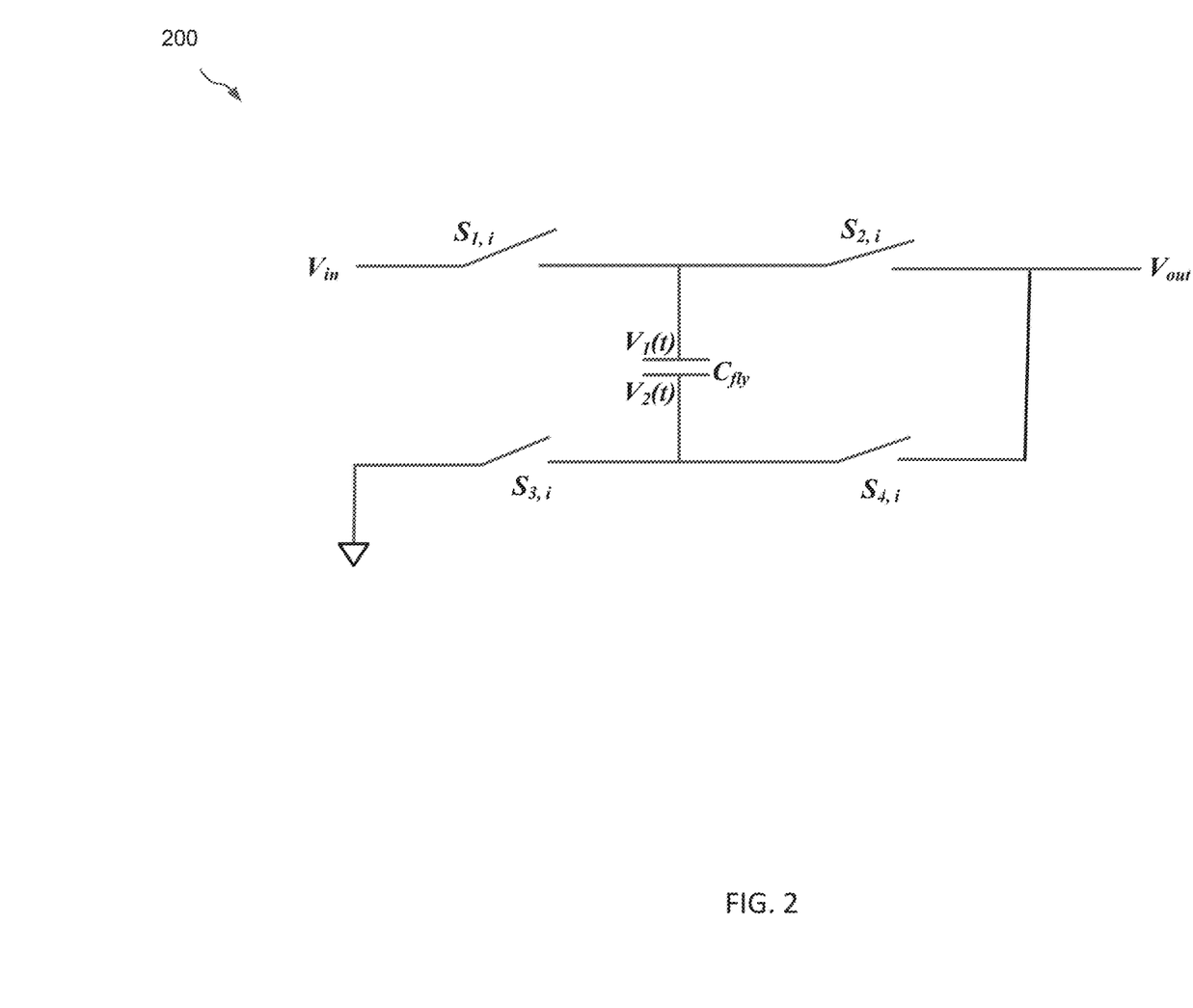
FIG. 2 illustrates an example of one 2:1 stage for identical switched capacitor (SC) voltage converter stages in a charge-withheld converter reshuffling (CoRe) system, according to some embodiments.

FIG. 2 illustrates an example of a 2:1 switched voltage converter stage for a switched capacitor (SC) voltage converter in a CoRe or charge-withheld CoRe system, according to some embodiments. Shown in FIG. 2 is a converter stage 200 for the SC voltage converter 124. The converter stage 200 includes a voltage input $V_{in}$, a voltage output $V_{out}$, a flying capacitor $C_{fly}$, and four switches $S_{1,i}$, $S_{2,i}$, $S_{3,i}$, and $S_{4,i}$.

The converter stage 200 represents a high-level schematic of one of N identical stages within the N-phase SC converter 124. The value of N is greater than 2 and may be a power of 2; however, the system is not limited in this regard. For example, the number of stages N may be from 2 stages to 128 stages, or 256 stages. The time delayed signals $PRNG'_i$, (i=1, 2, ..., N), as illustrated in FIG. 1, and a clock signal $CLK_i$ (see FIG. 3) control the states of the switches ($S_{1,i}$, $S_{2,i}$, $S_{3,i}$, $S_{4,i}$) in the $i^{th}$ converter stage of the SC converter 124 as follows $$\{S_{1,i}, S_{4,i}\} = PRNG'_i \otimes CLK_i \quad (2)$$

$$\{S_{2,i}, S_{3,i}\} = PRNG'_i \leq \overline{CLK_i} \quad (3)$$

Figure 3:
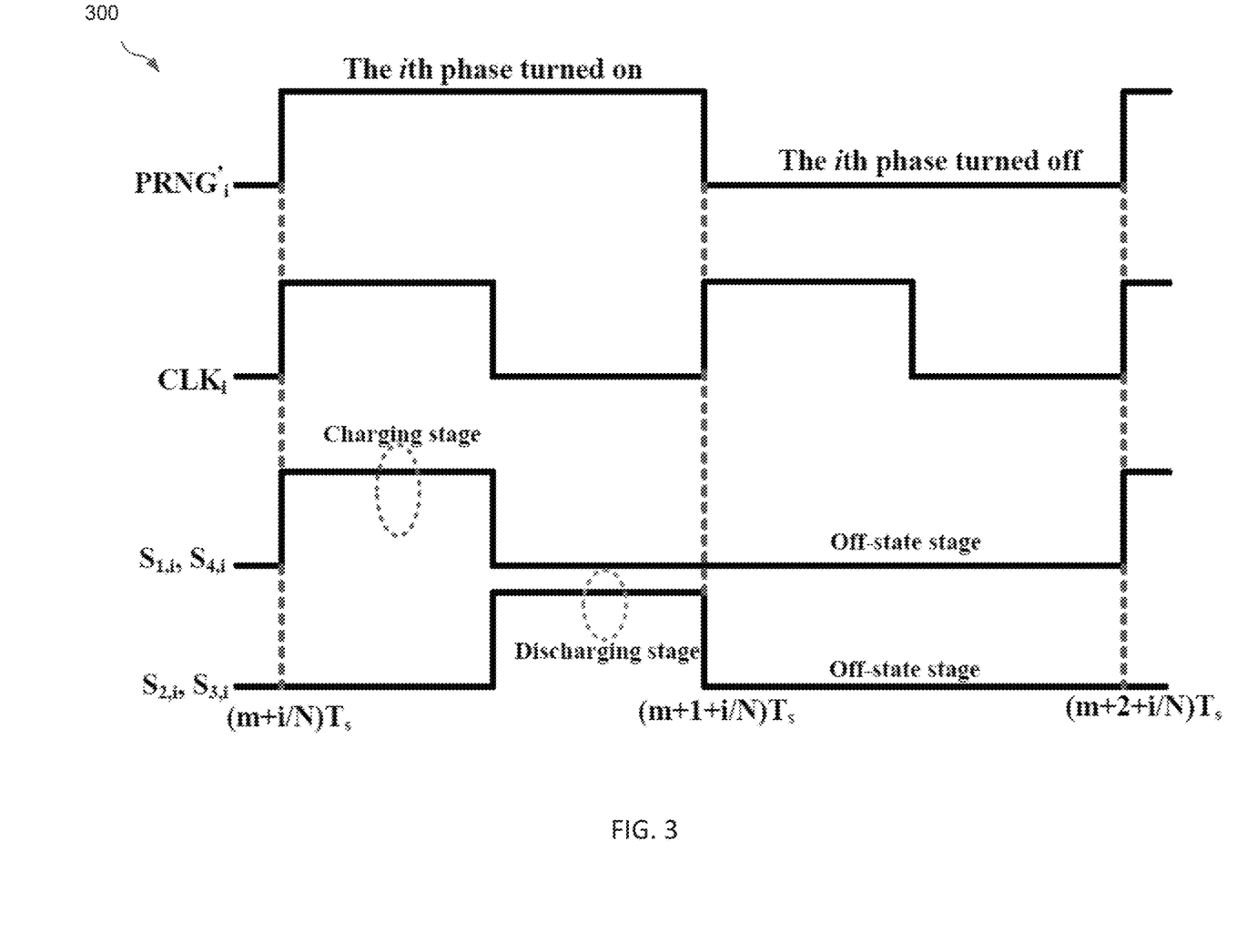
FIG. 3 illustrates example logic levels of signals that control the switches ($S_{1,i}$, $S_{2,i}$, $S_{3,i}$, $S_{4,i}$) within a converter reshuffling (CoRe) system, according to some embodiments.

FIG. 3 illustrates example logic levels of signals that control the switches ($S_{1,i}$, $S_{2,i}$, $S_{3,i}$, $S_{4,i}$) within a CoRe system, according to some embodiments. The signal waveforms corresponding to switches $\{S_{1,i}, S_{4,i}\}$ and $\{S_{2,i}, S_{3,i}\}$ for controlling the switches ($S_{1,i}$, $S_{2,i}$, $S_{3,i}$, $S_{4,i}$) are illustrated in FIG. 3. The signal $PRNG'_i$ is a binary variable and utilized to determine whether the $i^{th}$ phase of the SC converter 124 should be turned-on or turned-off within the next switching cycle.

A converter-reshuffling (CoRe) technique may be implemented by the N-phase switched capacitor (SC) voltage converter 124 and is based on converter-gating as a countermeasure against DPA attacks with negligible power overhead. The number of stages of the SC converter 124 that need to be activated is determined by the controller 130 based on workload information from the load 128, whereas the activation pattern of these stages is determined based on output from the N-bit PRNG 120. The N-bit PRNG 120 scrambles the input power profile of power delivered by the power supply 110 to the SC voltage converter 124. As a result, if an attacker is unable to synchronize a sampling frequency for sampling the input power data with the switching frequency of the on-chip SC voltage converter 124, a large amount of noise is inserted within the leakage data (input power) that is sampled by the attacker. Alternatively, if the attacker is able to synchronize a sampling frequency for sampling the input power with the switching frequency of the on-chip voltage converter by use of machine-learning attack methods, the scrambled power data can be unscrambled by the attacker and the CoRe countermeasure technique may be effectively neutralized. The reason for this countermeasure failure is that the total number of activated phases within a switch period has a high correlation with the load power dissipation. A charge-withheld CoRe technique, however, prevents an attacker from acquiring accurate input power information even if the attacker can synchronize the sampling frequency with the switch frequency of the N-bit SC converter 124.

Figure 4:
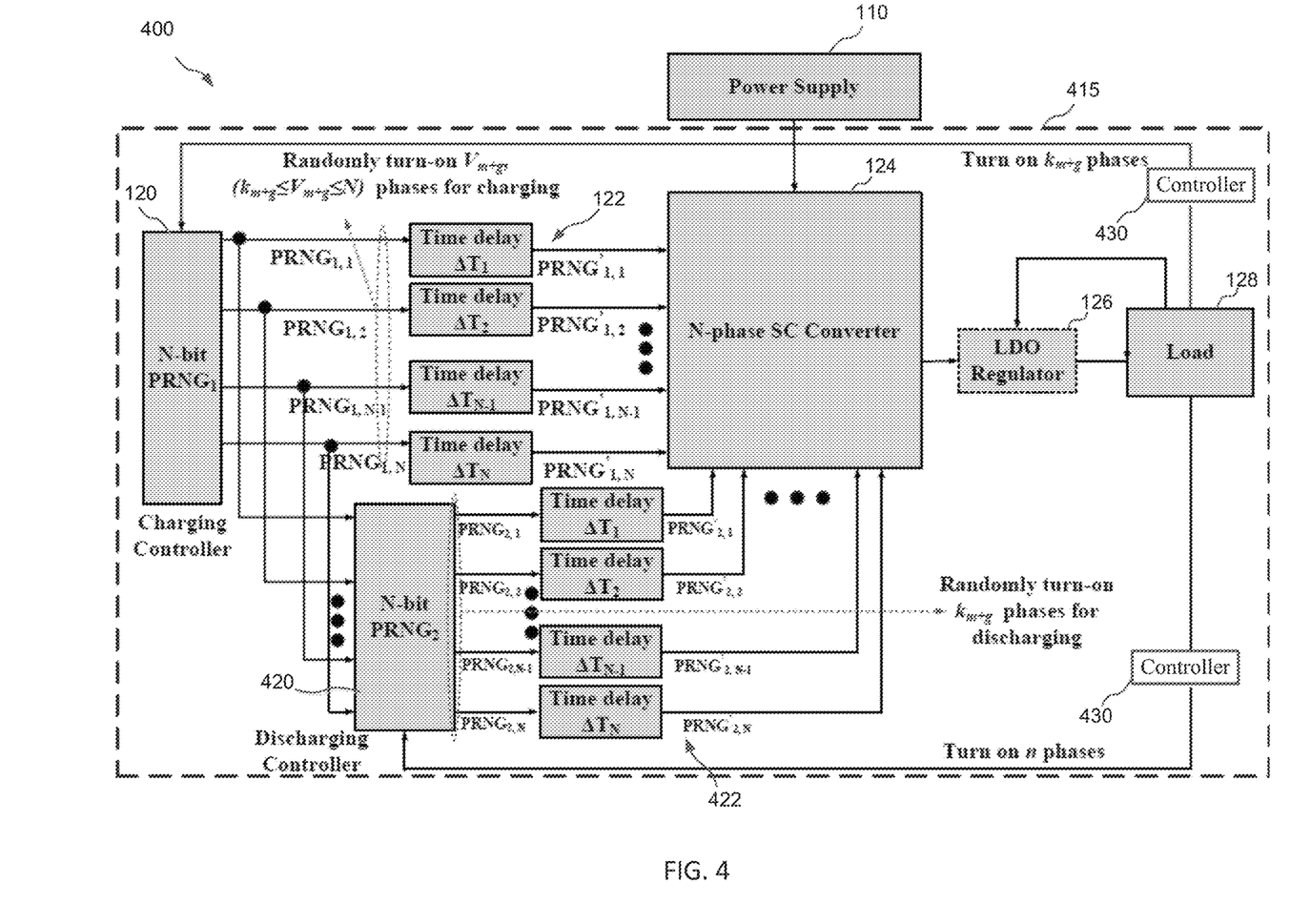
FIG. 4 illustrates example architecture for implementing a charge-withheld CoRe technique, according to some embodiments.

FIG. 4 illustrates example architecture for implementing a charge-withheld CoRe technique, according to some embodiments. FIG. 4 includes a charge-withheld CoRe system 400 that includes the power supply 110, a monitored system 415, the N-bit PRNG 120, an N-bit PRNG 420, the time delays 122, the time delays 422, the N-phase SC converter 124, the optional LDO 126, the load 128, and a controller 430. In some embodiments, all or a portion of the elements of the monitored system 415 comprise a system on a chip.

As described with respect to FIG. 1, the SC converter 124 receives power from the power supply 110 and outputs power to the load 128 via the optional LDO regulator 126. The amount of power drawn from the power supply 110 depends on the demand for power consumption by the load

128. An attacker may monitor power input to the monitored system 415 (or into the SC converter 124) to determine data (such as a secret key) and/or operations performed by the load 128.

The N outputs of the N-bit PRNG 120 are coupled to N gating inputs of the SC converter 124 via N respective time delays 122. Each signal in the random pattern of outputs from the N-bit PRNG 120 that is sent to a respective stage in the SC converter 124 is time delayed a portion of a switch period such that all of the output signals are clocked into SC converter 124 within a switch period. Each of the output signals generated from each of the N-bit PRNG 120 outputs is received in the SC converter 124 to gate the charging of their respective stages in the SC converter 124.

Furthermore, the N outputs of the N-bit PRNG 420 are coupled to a second set of N inputs in the SC converter 124. In this regard, each output of the N-bit PRNG 120 is coupled to a respective input of the N-bit PRNG 420 via a respective time delay 422. The N-bit PRNG 420 output signals received by the SC converter 124 gate the discharging of their respective switched capacitor stages in the SC converter 124.

The controller 430 is connected to the load 128, the N-bit PRNG 120 and the N-bit PRNG 420 and controls both of the N-bit PRNGs 120 and 420. In some embodiments, the controller 430 includes the N-bit PRNG 120 and/or the N-bit PRNG 420. In some embodiments, the controller 430 comprises separate controllers including a charging controller connected to the N-bit PRNG 120 and a discharging controller connected to the N-bit PRNG 420.

The controller 430 may include suitable logic, circuitry, interfaces, and/or code that is operable to determine a number of stages of the SC converter 124 that need to be charged and a number of stages to be discharged within a switch period where the number of stages charged and the number of stages discharged within the switch period is different. In some embodiments, the controller 430 includes an electronic processor and a memory that stores instructions that when executed by the electronic processor cause the controller 430 to perform the functions described herein. The controller 430 determines a number of stages to be charged and a number of stages to be discharged within a switch period such that the number of stages that are discharged provides adequate power to the load 128 to meet the demand for power. Also, the number of stages that are charged allows for a portion of the charge to be withheld in the SC converter 124 into the next switch period after the discharge of the switch capacitors to the load 128 occurs. Therefore at the beginning of a switch period, some of the stages of the SC converter 124 are holding a charge. The charge withheld in the SC converter 124 functions to decorrelate the signature of the power drawn from the input power supply 110 relative to the amount of power utilized by the load 128. The N-bit PRNGE 120 and the N-bit PRNG 420 randomize the pattern of the stages within the SC converter 124 that are charged and discharged respectively. The controller 430 keeps track of which stages in the SC controller 124 are charged based on the output of the N-bit PRNG 120 and the N-bit PRNG 420, to inform the PRNG 120 and PRNG 420 as to which stages are available for charging and discharging. For example, the inputs to PRNG 420 that come from the PRNG 120 informs the PRNG 420 (or the controller 430) regarding the activated stages in the SC converter 124 so that PRNG 420 can use this information to discharge those stages during a later switch period.

In other systems, a switching frequency $f_s$ of an SC voltage converter is proportional to its output power $P_{out}$. Fluctuations in switching frequency $f_s$ therefore can leak critical workload information to an attacker. However, in the charge-withheld CoRe system 400 and technique, the switching frequency is kept constant under varying workload conditions (i.e., the switching frequency is workload-agnostic) to minimize the leakage of workload information at the input to the SC voltage converter 124. Instead, the number of activated phases in the charge withheld CoRe system 400 is adaptively changed to satisfy the workload demand. As compared to the CoRe technique where only a single PRNG is utilized, as shown in FIG. 1, the charging and discharging states of the flying capacitors within the charge-withheld CoRe system 400 are controlled by two independent PRNGs (PRNG 120 and PRNG 420), as illustrated in FIG. 4. For instance, for an N-phase charge-withheld CoRe technique, if the load 128 requires activation of $k_{m+g}$ additional phases based on the workload, the PRNG 120 would randomly select $V_{m+g}$, ($k_{m+g} \leq V_{m+g} \leq N$) phases for charging. When the charging period ends, the PRNG 420 would choose $k_{m+g}$ phases out of the selected $V_{m+g}$ phases for discharging. As a result, the energy stored in the corresponding ($V_{m+g} - k_{m+g}$) phases is used for power delivery in the next couple of switch cycles. With this charge withholding technique, the total number of activated phases within a switching period is no longer highly correlated with the actual load power consumption.

The architecture including two PRNGs shown in FIG. 4 supports a charge-withheld CoRe technique. When a demand for power by the load 128 changes, a certain number of gated stages, e.g., $k_{m+g}$ stages, need to turn on. $PRNG_1$ 120 randomly selects $V_{m+g}$, ($k_{m+g} \leq V_{m+g} \leq N$) stages and concurrently transmits the logic signal $PRNG_{1,i}$, (i=1, 2, ..., N) both to the corresponding converter 124 stages and to $PRNG_2$ 420. The $i^{th}$ converter 124 stage turns-on if the corresponding $PRNG'_{1,i}$ value is 1. During the discharging stage, when $PRNG_2$ 420 receives data generated by $PRNG_1$ 120, after half a switch period, $PRNG_2$ 420 sends out signal $PRNG_{2,i}$, (i=1, 2, ..., N) to discharge $k_{m+g}$ phases out of the $V_{m+g}$ phases selected by $PRNG_1$ 120. Under this condition, the stages that charge and discharge are independent and controlled, respectively, by $PRNG_1$ 120 and $PRNG_2$ 420. The state of the switches ($S_{1,i}$, $S_{2,i}$, $S_{3,i}$, $S_{4,i}$) in a charge-withheld CoRe technique is $$\{S_{1,i}, S_{4,i}\} = PRNG'_{1,i} \otimes CLK_i \quad (4)$$

$$\{S_{2,i}, S_{3,i}\} = PRNG'_{2,i} \otimes \overline{CLK_i} \quad (5)$$

where $PRNG'_{1,i}$ and $PRNG'_{2,i}$ are, respectively, the delayed output signal from $PRNG_1$ 120 and $PRNG_2$ 420.

Figure 5:
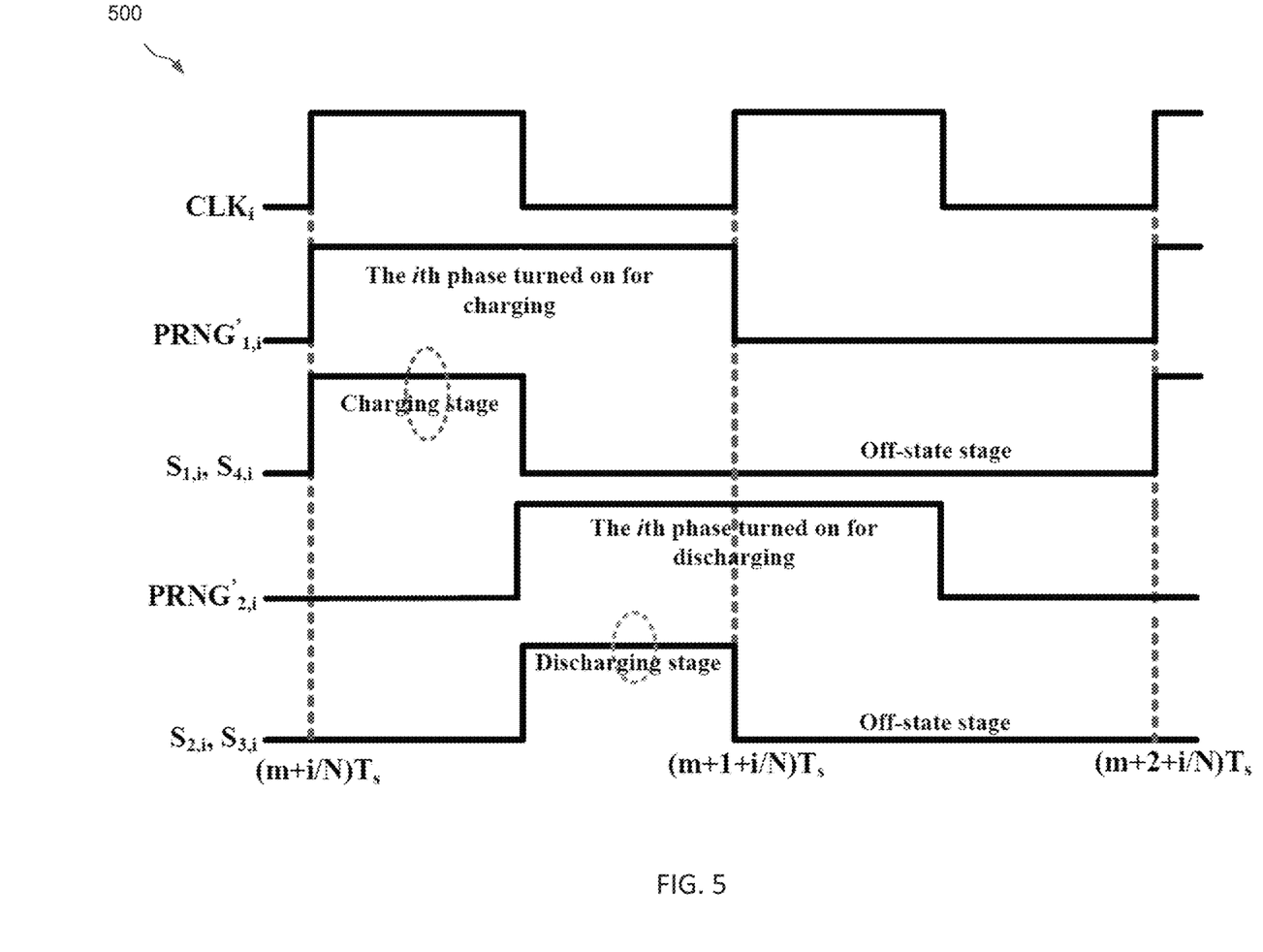
FIG. 5 illustrates example logic level of signals that control the switches ($S_{1,i}$, $S_{2,i}$, $S_{3,i}$, $S_{4,i}$) within a charge-withheld CoRe system, according to some embodiments.

FIG. 5 illustrates example logic level of signals that control the switches ($S_{1,i}$, $S_{2,i}$, $S_{3,i}$, $S_{4,i}$) within a charge-withheld CoRe system 400, according to some embodiments. As compared to the single PRNG CoRe technique of FIG. 1, the signal waveforms of switches ($S_{1,i}$, $S_{2,i}$, $S_{3,i}$, $S_{4,i}$) in a charge-withheld CoRe system 400 are controlled by two different PRNGs 120 and 420, as shown in FIG. 5. $PRNG_1$ 120 controls the switches ($S_{1,i}$, $S_{4,i}$) for charging the switched capacitor stage i while $PRNG_2$ 420 controls the switches ($S_{2,i}$, $S_{3,i}$) for discharging the switched capacitor stage i.

Figure 6:
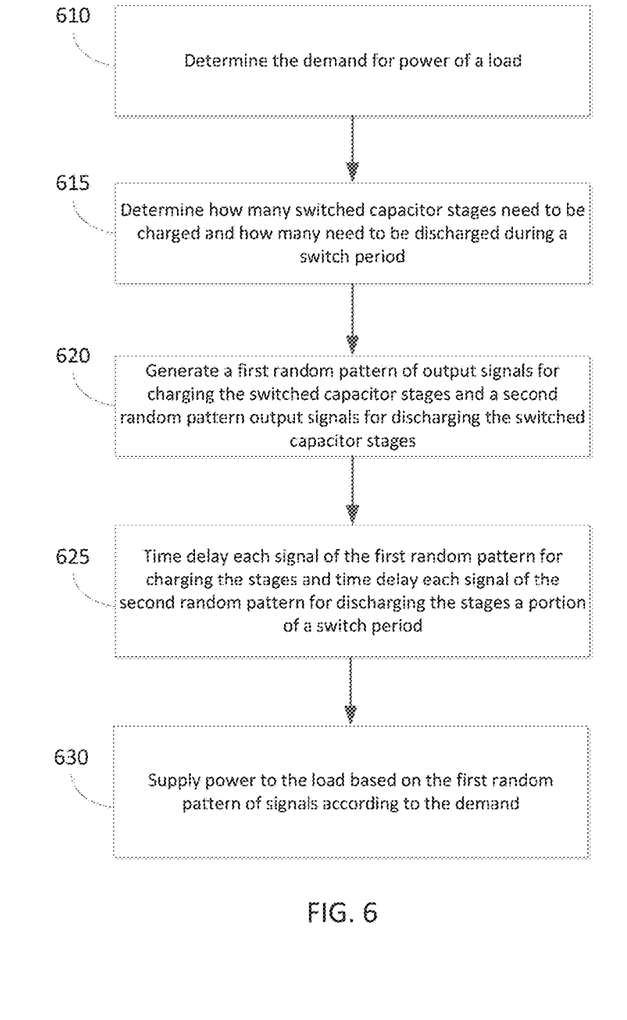
FIG. 6 illustrates a method for a charge withheld CoRe technique.

FIG. 6 illustrates a method for a charge withheld CoRe technique. In step 610, the controller 430 determines a power consumption demand of the load 128, where the load may be a cryptographic circuit.

In step 615, the controller 430 determines a first number of SC converter 124 stages to be charged during a switch period and a second number of stages to be discharged during the switch period, such that the charged and discharged stages provide power to the load in accordance with the demand and maintain a random number of charged stages over a random number of switch periods in the SC converter 124.

In step 620, the N-bit PRNG 120 generates a first random pattern of output signals for gating the SC converter 124 to charge the determined first number of stages, and the N-bit PRNG 420 generates a second random pattern of output signals for gating the SC converter 124 to discharge the determined second number of stages.

In step 625, each signal in the random pattern of outputs from the PRNG 120 that is sent to a respective stage in the SC converter 124 is time delayed a portion of a switch period such that all of the charging output signals are clocked into SC converter 124 within a switch period. Moreover, each signal in the random pattern of outputs from the PRNG 420 that is sent to a respective stage in the SC converter 124 is time delayed a portion of a switch period such that all of the discharging output signals are clocked into SC converter 124 within the switch period.

In step 630, the SC converter 124 supplies power to the load 128 based on the first random pattern of output signals in accordance with the demand for power.

Security evaluation of differential power analysis (DPA) attacks can be based on security performance models of CoRe techniques and charge withheld CoRe techniques versus DPA attacks and machine learning (ML) based DPA attacks. In information theory, entropy is widely used to quantify the amount of leakage from critical systems. In order to quantify the amount of leakage in power side-channels, the power trace entropy (PTE) of the power profile information that is monitored by an attacker is adopted to quantify the security levels of the CoRe technique (FIG. 1) and the charge-withheld CoRe technique (FIG. 4) against DPA attacks. When there is a one-to-one relationship between the input power $P_{in}$ and load power $P_{out}$ of a voltage converter, the PTE value becomes zero. Alternatively, if the voltage converter has a many-to-one or one-to-many relationship between the $P_{in}$ and $P_{out}$ such that $f_1(P_{out})$, $f_2(P_{out})$, ..., $f_k(P_{out})$ lead to a series of input power $P_{in}^1$, $P_{in}^2$, ..., $P_{in}^k$ and the probability of each input power $P_{in}^l$: (l=1, 2, ..., k) is pl, the PTE of the converter becomes:

$$PTE = -\sum_{l=1}^{k} pl\log_2^{pl}. \quad (6)$$

For a cryptographic device (such as the load 128) with an embedded CoRe technique system 100, an attacker can sample the average input power within a switch period $\overline{P_{in,1}}$, $\overline{P_{in,2}}$, ..., and exploit this input data to predict the average dynamic power within a switch period $\overline{P_{pr,1}}$, $\overline{P_{pr,2}}$, .... The attacker can then perform a correlation analysis between the monitored input power and the predicted power to estimate the correct key. Alternatively, the attacker can sample the average input power for a couple of switch cycles to strengthen the attack. For example, the attacker may sample K switch cycles to obtain the average input power where the average input power and predicted power are, respectively, $\Sigma_{j=1}^{k}(\overline{P_{in,j}}/K)$ and $\Sigma_{j=1}^{k}((\overline{P_{pr,j}}/K)$. The attacker can utilize these data to perform a correlation analysis.

Figure 7:
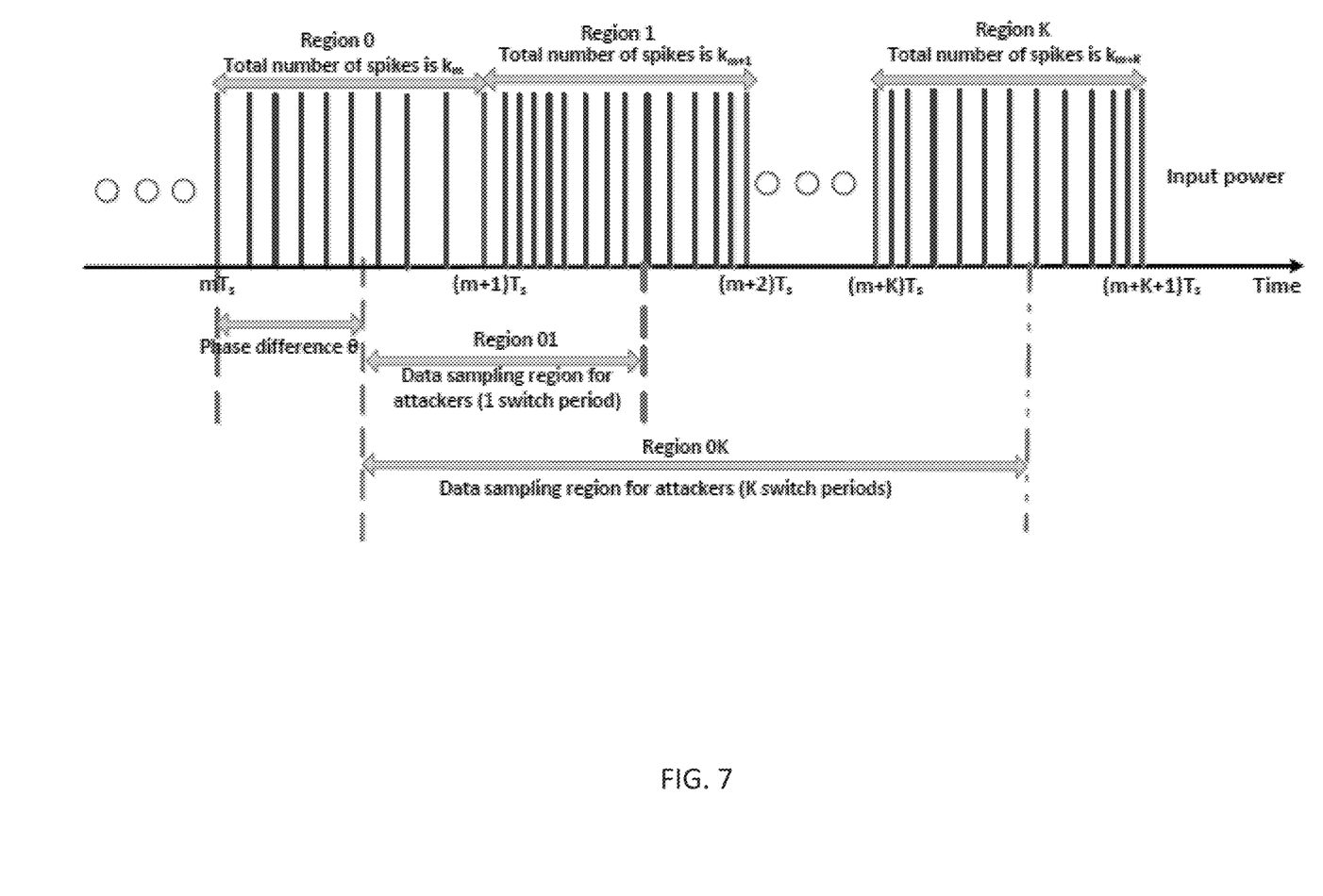
FIG. 7 illustrates an example input power profile for a CoRe technique, according to some embodiments.

FIG. 7 illustrates an example input power profile for a CoRe technique, according to some embodiments. If the total number of SC converter phases in the CoRe technique (described with respect to FIG. 1) is N and the attacker intends to sample the average input power within K switch cycles. Since there is a phase difference between the switching frequency and data sampling rate, the input power information in (K+1) switch cycles is recorded to obtain all of the possible power information of K switch cycles which may be sampled by the attacker. The input power distribution between $mT_s$ and $(m+K+1) T_s$, as shown in FIG. 7, can be denoted by an array $A_m$ as follows $$A_m = [a_{m,1}, a_{m,2}, \ldots, a_{m,N}, a_{m+1,1}, a_{m+1,2} \ldots$$
$$a_{m+1,N}, \ldots a_{m+K,1}, a_{m+K,2} \ldots, a_{m+K,N}]P_0. \quad (7),$$

where $a_{m+g,i} \in \{0,1\}$, (g=0, 1, ..., K and i=1, 2, ..., N) and $\Sigma_{i=1}^{N} a_{m+g,i} = k_{m+g}$. $P_0$ is the power consumed by each converter stage within the CoRe technique and $k_{m+g}$, (g=0, 1, ..., K) is the total number of active phases within a switch period as shown in FIG. 6. Note that the number of active phases is equal to the number of spikes in a switch period. Another array $W_m = [w_1, w_2, \ldots w_{(K+1)N}]$ is used to represent the position of the spikes which would be recorded by the attacker within K switch periods and the value of the elements $w_q$, (q=1, 2, ..., (K+1) N) in $W_m$ becomes $$w_q = \begin{cases} 0, & q \leq [\theta/360*N] \\ 1, & [\theta/360*N] < q \leq [\theta/360*N] + K*N, \\ 0, & q > [\theta/360*N] + K*N \end{cases} \quad (8)$$

where θ is the phase difference, as illustrated in FIG. 7. The average input power within K switch periods $\overline{P_{m,k}}$ sampled by the attacker therefore becomes $$\overline{P_{m,K}} = \frac{A_m W_m^T}{KN}. \quad (9)$$

When all of the possible $A_m$ and $W_m$ arrays are analyzed, the probability $a_l(\theta, k_m, \ldots, k_{m+K})$ of the average input power $\overline{P_{m,K}}$ can be written as $$\alpha_l(\theta, k_m, \ldots, k_{m+K}) = \frac{x_l(\theta, k_m, \ldots, k_{m+K})}{\sum_{l=1}^{G} x_l(\theta, k_m, \ldots, k_{m+K})}, \quad (10)$$

where $x_l(\theta, k_m, \ldots, k_{m+K})$, (l=1, 2, ..., G) is the number of all possible values of $Pm_{,K}$ induced by different $A_m$ and $W_m$ arrays, and G represents the total number of possible values of $\overline{P_{m,k}}$. The PTE of CoRe technique $PTE_{CR}(\theta)$ then becomes $$PTE_{CR}(\theta) = -\sum_{l=1}^{G} H_l \log_2^{H_l}, \quad (11)$$

$$H_l = \alpha_l(\theta, k_m, \ldots, k_{m+K}), \quad (12)$$

and the average PTE value of the CoRe technique $\overline{PTE_{CR}}$ is $$\overline{PTE_{CR}} = \frac{\int_0^{360} PTE_{CR}(\theta)d\theta}{360}. \quad (13)$$

For the charge-withheld CoRe technique (described with respect to FIG. 4), a matrix $B_m(K+1, N)$ is defined to denote the phase sequences that are selected for charging within (K+1) consecutive switch cycles by $PRNG_1$ 120. $B_m(K+1, N)$ can be written as $$B_m(K+1, N) = \begin{pmatrix} b_{m,1} & \cdots & b_{m,N} \\ b_{m+1,1} & \cdots & b_{m+1,N} \\ \vdots & \cdots & \vdots \\ b_{m+K,1} & \cdots & b_{m+K,N} \end{pmatrix}, \quad (14)$$

where $b_{m+g,i} \in \{0,1\}$, (g=0, 1, ..., K and i=1, 2, ..., N) and $k_{m+g} \leq V_{m+g} = \sum_{i=1}^{N} b_{m+g,i} \leq N$. Another matrix $C_m(K+1, N)$ is defined to record whether the flying capacitor in the corresponding converter stage has already withheld charge or not before being selected by PRNG 120 for charging. Note the elements $c_{m+g,i}$ in matrix $C_m(K+1, N)$ are also binary. Accordingly, only the $i^{th}$ converter stage which is selected for charging and does not have withheld charge from the previous cycles can exhibit the related power spike in the input power profile. Additionally, a matrix $D_m(K+1, N)$ is defined to reflect the input power information within the (K+1) consecutive switch periods. Note that the elements $d_{m+g,i}$ in $D_m(K+1, N)$ satisfy the following expression $$d_{m+g,i} = (b_{m+g,i} \otimes 1) \otimes (\overline{c_{m+g}} \otimes 1). \quad (15)$$

Another binary (K+1)×N matrix $E_m(K+1, N)$ is used to record the phases which are chosen by PRNG 420 for discharging. The relationship between the elements $e_{m+g,i}$ in $E_m(K+1, N)$ 1;N) and $b_{m+g,i}$, is $$b_{m+g,i} - e_{m+g,i} \geq 0 \quad (16)$$

$$\sum_{i=1}^{N} (b_{m+g,i} \otimes e_{m+g,i}) = k_{m+g} \quad (17)$$

Finally, in the voltage conversion system, the number of charged phases needs to be equal to the number of discharged phases plus the number of charge-withheld phases all the time. This constraint is satisfied as $$c_{m+g+1,i} = c_{m+g,i} + d_{m+g,i} - e_{m+g,i} \quad (18)$$

After all of the elements $d_{m+g,i}$ in $D_m(K+1, N)$ have been obtained, the matrix $D_m(K+1, N)$ can be converted into a 1×(K+1) N array $A'_m$ which is similar to the array $A_m$ as $$A'_m = [d_{m,1}, d_{m,2}, \ldots, d_{m,N}, d_{m+1,1}, d_{m+1,2}, \ldots, d_{m+1,N}, \ldots, d_{m+K,1}, d_{m+K,2}, \ldots, d_{m+K,N}]P_0. \quad (19)$$

After satisfying all of the aforementioned constraints, the PTE value of the proposed charge-withheld CoRe technique (FIG. 4) can be determined with equation (11).

Security Evaluation can be performed for machine-learning (ML) based DPA attacks. To perform a successful ML based DPA attack, two steps are required. The first step is to determine the switch period and phase difference ($T_s$, θ) utilizing machine-learning attacks. The second step is to synchronize the data sampling rate with the switching frequency. To estimate the switch period $T_s$, the attacker can apply a number of random input data to determine the minimum time gap $\Delta T_s$ between the two adjacent spikes in the input power profile. For an N-phase SC converter, the switch period $T_s$ is equal to $N \Delta T_s$, therefore the attacker only needs to determine the number of phases N to acquire the correct $T_s$. In one example, an attack may be performed by entering random input plaintext and then observing the input power signature to synchronize the attack. Advanced machine learning techniques may be utilized to determine the random patterns generated by the PRNGs and this information may be utilized to synchronize the attack. However, the disclosure is not limited to any specific method of attacking a CoRe system or a charge-withheld CoRe system.

Assume that the attacker estimates the switch period as $T_s = F \Delta T_s$, (F=1, 2, ...) and sequentially applies two different input data ($data_1$ and $data_2$) with the frequency $f_0 = 1/(F \Delta T_s)$. The attacker then estimates θ=[0: 360/F: 360] as all of the possible phase difference scenarios between the attack and switching frequency to synchronize the attack. If the estimation of (F, θ) is correct, the total number of spikes $k_{m+g}$, as illustrated in FIG. 6, can be written as $$k_{m+g} = k', \, (g=0, 2, 4, \ldots) \quad (20)$$

$$k_{m+g} = k'', \, (g=1, 3, 5, \ldots) \quad (21)$$

where k' and k" are, respectively, the total number of input power spikes due to inputs $data_1$ and $data_2$. In this case, the total number of input power spikes within two consecutive switch periods is (k'+k"), which is a constant value. If the attacker can synchronize the attack such that a constant average power profile in any two consecutive switch periods is obtained, the correct switch period and phase difference ($T_s$, θ) are successfully determined. Once the correct ($T_s$, θ) are obtained, the attacker can eliminate all of the noise inserted by the CoRe technique (FIG. 1) and perform a successful DPA attack.

ML based DPA attacks are rather difficult to implement for the charge-withheld CoRe technique (FIG. 4) as the total number of spikes within a switch period is variable. Even if the attacker can obtain the information about ($T_s$, θ) and synchronize the attack with the switching frequency, the attacker can only eliminate the noise data induced by the CoRe technique. However, the noise data due to the charge-withholding operation cannot be eliminated with ML based DPA attacks.

Power efficiency of the charge withheld CoRe technique (FIG. 4) can be analyzed. During the charge-withholding operation, a number of flying capacitors within a multi-stage SC voltage converter 124 are charged. Some of these capacitors maintain the charge for a random number of cycles instead of discharging after each charging phase. Therefore, power dissipation in the form of leakage from the flying capacitors can be investigated.

For a multi-phase 2:1 SC converter, as shown in FIG. 2, the top plate voltage $V_1(t)$ and the bottom plate voltage $V_2(t)$ of the flying capacitor in a charge-withheld phase can be denoted as follows $$V_1(t) = (V_{in} - V_{out})e^{(-t/R_{off}C_{fly,top})} + V_{out}, \quad (22)$$

$$V_2(t) = V_{out}e^{(-t/R_{off}C_{fly,top})}, \quad (23)$$

where $V_{in}$ and $V_{out}$ are, respectively, the input and output voltages. t is the discharging time, $R_{off}$ is the off-state resistance of the MOSFET switch, $C_{fly,top}$ is the top plate flying capacitance and α is the bottom plate capacitance ratio. The total dissipated energy ratio µ(t) of the flying capacitor due to the charge leakage can be written as $$\mu(t) = 1 - \frac{\frac{1}{2}C_{fly,top}V_1^2(t) + \frac{1}{2}\alpha C_{fly,top}V_2^2(t)}{\frac{1}{2}C_{fly,top}V_{in}^2 + \frac{1}{2}\alpha C_{fly,top}V_{out}^2}. \quad (24)$$

By substituting equations (22) and (23) into (24), the number of switch cycles M(M=t/T$_s$) required to deplete the corresponding energy in a flying capacitor can be obtained.

The number of switch cycles M required to dissipate 1% of the total stored energy in the flying capacitor through leakage is about 101 cycles assuming a flying capacitor $C_{fly,top}$=1 pF, the bottom plate capacitance ratio α=6.5%, input voltage $V_{in}$=1.2V, switching frequency $f_s$=60 MHz, and off-state resistance of a MOSFET in 90 nm $R_{off}$=240 MΩ. The proposed charge-withholding technique therefore practically does not cause any efficiency degradation due to the charge leakage from the flying capacitors during the withholding operation.

Figure 8:
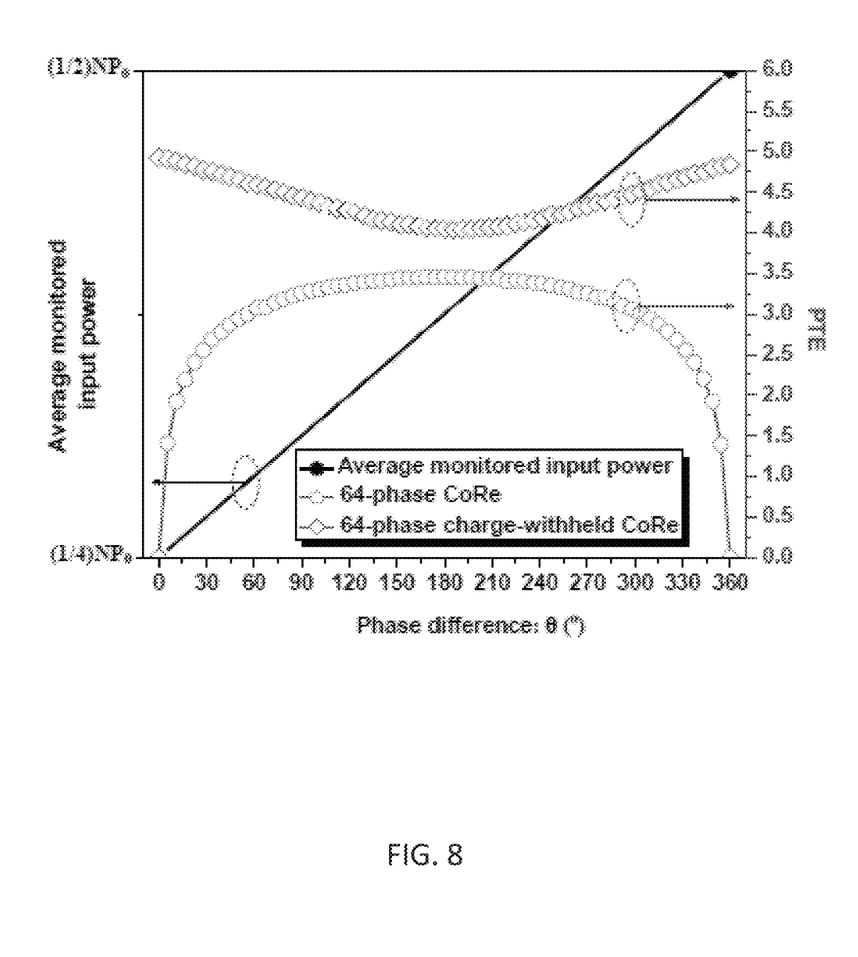
FIG. 8 illustrates power trace entropy (PTE) value versus the phase difference θ between the switching frequency and data sampling frequency for CoRe and charge-withheld CoRe techniques, according to some embodiments.

FIG. 8 illustrates power trace entropy (PTE) value versus the phase difference θ between the switching frequency and data sampling frequency for CoRe techniques (FIG. 1) and charge-withheld CoRe technique (FIG. 4), according to some embodiments. The input PTE versus the phase difference θ for the 64-phase CoRe and the 64-phase charge-withheld CoRe techniques are shown in FIG. 8 when the load power varies from (1/4)ηNP$_0$ to (1/2)ηNP$_0$. Here η is the power efficiency and the number of switch cycles K sampled by the attackers is 1. As compared to the CoRe technique (FIG. 1), the disclosed charge-withheld CoRe technique (FIG. 4) has two advantages. The charged withheld CoRe technique eliminates the possibility of having zero PTE even when the phase difference θ is 0° or 360°. Additionally, the average PTE value of the disclosed charge-withheld CoRe technique is enhanced by about 46.1% as compared to the CoRe technique (FIG. 1).

Figure 9:
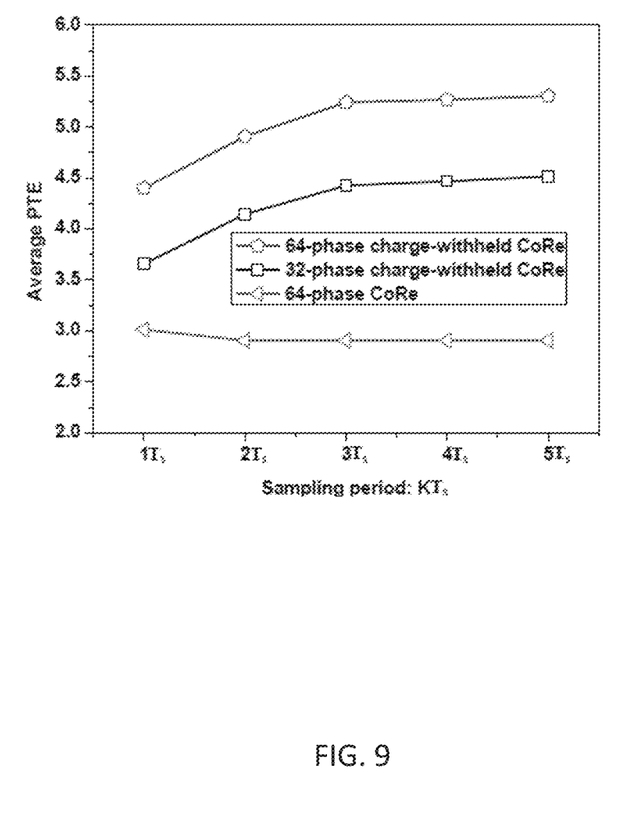
FIG. 9 illustrates the effect of a sampling period on the average power trace entropy (PTE) value.

FIG. 9 illustrates the effect of the sampling period $KT_s$ on the average PTE value. The average PTE value of the CoRe technique (FIG. 1) slightly decreases when $KT_s$ increases. Alternatively, the average PTE value of the disclosed charge-withheld CoRe technique (FIG. 4) increases more than 20% when $KT_s$ increases three-fold. Further increasing $KT_s$ does not result in a significant change in PTE as PTE converges to a certain value. The primary reason for the convergence of PTE is that as the attacker increases the sampling period, the probability for the withheld charge to be delivered to the power grid within the same sampling period increases. Since the effective number of charge withholding from one sampling cycle to another sampling cycle reduces by increasing the attacker's sampling period, the PTE value converges to a constant value.

Figure 10:
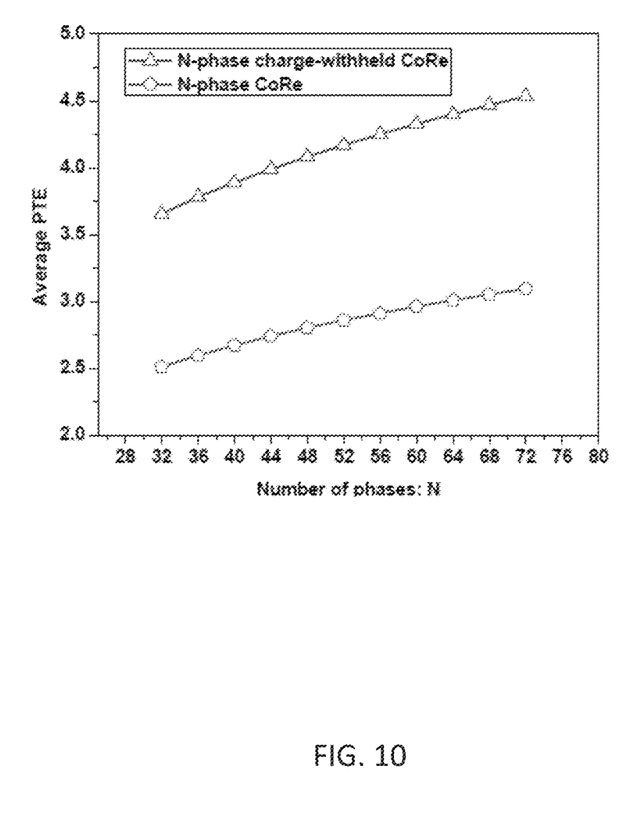
FIG. 10 illustrates the impact of the number of stages within a switched capacitor voltage converter on the average power trace entropy (PTE).

FIG. 10 illustrates the impact of the number of stages within the SC voltage converter 124 on the average PTE. The average PTE value increases with a larger number of phases N for both conventional and charge-withheld CoRe techniques. The average PTE value of the disclosed charge-withheld CoRe technique, however, has a steeper slope, indicating better security-performance against DPA attacks with a larger number of converter phases.

The flying capacitors that withhold charge in the charge-withheld CoRe technique system cannot be utilized as a filter capacitor as these capacitors are not connected to the output node during the charge-withholding operation. This would slightly increase the output voltage ripple. For example, the amplitude of the output ripple voltage increases less than 2.5 mV for a 32 phase SC voltage converter 124 when only eight of the stages are active. Alternatively, the ripple amplitude increases less than 1 mV when more than half of the stages are active. The increase in the ripple voltage can be mitigated by increasing the number of SC converter stages. If the number of stages is increased from 32 to 48, the ripple amplitude would be reduced by 40%.

The disclosed charge-withheld CoRe technique withholds a random portion of input charge and delivers this charge to the power network after a random time period. This proposed technique is more effective than the CoRe technique that does not withhold charge against DPA attacks and ML based DPA attacks. The possibility of having zero PTE under certain conditions is successfully eliminated and the average PTE value is increased more than 46% with negligible power loss due to the leakage of flying capacitors. Since the charge that is withheld for a random amount of time is eventually delivered to the power grid, there is no additional power overhead.

Various features and advantages of the invention are set forth in the following claims.

What is claimed is:

1. A system for decorrelating a switched capacitor voltage converter input power and output power provided to a load, the system comprising:
    an N stage switched capacitor voltage converter that receives input power from a power supply and provides output power to a load;
    a charging controller comprising:
        a first N bit pseudorandom number generator, wherein each output of the first N bit pseudorandom number generator is coupled to a respective input of the N stage switched capacitor converter via one of N respective time delay components;
        an electronic processor, and a memory comprising instructions that when executed by the electronic processor cause the charging controller to transmit signals to the N stage switched capacitor converter for gating charging of a first subset of stages of the N stage switched capacitor converter; and
    a discharging controller comprising;
        a second N bit pseudorandom number generator, wherein each output of the second N bit pseudorandom number generator is coupled to a respective one of a second N inputs of the N stage switched capacitor converter via a respective one of a second N time delay components;
        an electronic processor, and a memory comprising instructions that when executed by the electronic processor cause the discharging controller to transmit signals to the second N inputs of the N stage switched capacitor converter for gating discharging of a second subset the stages of the N stage switched capacitor converter.

2. The system of claim 1, wherein the load is a cryptographic circuit that receives power from the N stage switched capacitor voltage converter.

3. The system of claim 1, wherein a number of the stages in the first subset of the N switched capacitor stages and a number of the stages in the second subset of the N switched capacitor stages are different.

4. The system of claim 1, wherein a number of the stages discharged in a switch period is based on a demand for input power consumption by the load, and a pattern of the discharged stages in the switch period is based on an output pattern of the of the second N bit pseudorandom number generator.

5. The system of claim 1, wherein a switch frequency of the N stage switched capacitor voltage converter is held constant for varying levels of input power.

6. The system of claim 1, wherein the N stage switched capacitor converter withholds a random amount of charge for a random amount of time based on a difference between a number of prior activated N bit switch capacitor stages and a number of prior discharged N bit switch capacitor stages.

7. The system of claim 1, wherein for i=1 to N, a cycle of an $i^{th}$ clock output for charging and discharging an $i^{th}$ stage of the N stage switched capacitor converter is delayed by $(i/N)T_s$, wherein $T_s$ is a switch period of the N stage switched capacitor converter.

8. The system of claim 1, wherein for i=1 to N, gating for discharging the $i^{th}$ stage of the N stage switched capacitor converter is delayed by a portion of a switch period relative to gating for charging the $i^{th}$ stage of the N stage switched capacitor converter.

9. The system of claim 1, wherein for i=1 to N, input to the $i^{th}$ stage for charging the $i^{th}$ stage of the N stage switched capacitor converter received from the respective $i^{th}$ bit of the first N bit pseudorandom number generator is delayed by $(i/N)T_s$ in accordance with a first phase of an $i^{th}$ clock cycle, and input to the $i^{th}$ stage for discharging the $i^{th}$ stage of the N stage switched capacitor received from the $i^{th}$ bit of the second N bit pseudorandom number generator is delayed by $(i/N)T_s$ in accordance with the second phase of the $i^{th}$ clock cycle, wherein $T_s$ is a switch period of the N stage switched capacitor converter.

10. The system of claim 1, wherein the system for scrambling an input power profile of a voltage converter including the N stage switched capacitor voltage converter, the charging controller, the discharging controller, and the load comprise a system on a chip.

11. A method for decorrelating a switched capacitor voltage converter input power and output power provided to a load, the method comprising:
   receiving input power by an N stage switched capacitor voltage converter from a power supply and providing output power to a load;
   gating charging of a first subset of stages of the N stage switched capacitor voltage converter by a charging controller comprising a first N bit pseudorandom number generator, wherein each output of the first N bit pseudorandom number generator is coupled to one of N respective inputs of the N stage switched capacitor converter via one of N respective time delay components; and
   gating discharging of a second subset of the stages of the N switched capacitor voltage converter by a discharging controller comprising a second N bit pseudorandom number generator, each output of the second N bit pseudorandom number generator is coupled to a respective one of a second N inputs of the N stage switched capacitor converter via a respective one of a second N time delay components.

12. The method of claim 11, wherein the load is a cryptographic circuit that receives power from the N stage switched capacitor.

13. The method of claim 11, wherein a number of the stages in the first subset of the N switched capacitor stages and a number of the stages in the second subset of the N switched capacitor stages are different.

14. The method of claim 11, wherein a number of the stages discharged in a switch period is based on a demand for input power consumption by the load, and a pattern of the discharged stages in the switch period is based on an output pattern of the of the second N bit pseudorandom number generator for gating the discharging of the second subset of stages of the N stage switched capacitor converter.

15. The method of claim 11, wherein a switch frequency of the N stage switched capacitor voltage converter is held constant for varying levels of input power.

16. The method of claim 11, wherein the N stage switched capacitor converter withholds a random amount of charge for a random amount of time based on a difference between a number of prior activated N bit switch capacitor stages and a number of prior discharged N bit switch capacitor stages.

17. The method of claim 11, wherein for i=1 to N, a cycle of an $i^{th}$ clock output for charging and discharging an $i^{th}$ stage of the N stage switched capacitor converter is delayed by $(i/N)T_s$, wherein $T_s$ is a switch period of the N stage switched capacitor converter.

18. The method of claim 11, wherein for i=1 to N, gating for discharging the $i^{th}$ stage of the N stage switched capacitor converter is delayed by a portion of a switch period relative to gating for charging the $i^{th}$ stage of the N stage switched capacitor converter.

19. The method of claim 11, wherein for i=1 to N, input to the $i^{th}$ stage for charging the $i^{th}$ stage of the N stage switched capacitor converter received from the respective $i^{th}$ bit of the first N bit pseudorandom number generator is delayed by $(i/N)T_s$ in accordance with a first phase of an $i^{th}$ clock cycle, and input to the $i^{th}$ stage for discharging the $i^{th}$ stage of the N stage switched capacitor received from the $i^{th}$ bit of the second N bit pseudorandom number generator is delayed by $(i/N)T_s$ in accordance with the second phase of the $i^{th}$ clock cycle, wherein $T_s$ is a switch period of the N stage switched capacitor converter.

20. The method of claim 11, wherein the N stage switched capacitor voltage converter, the charging controller, the discharging controller, and the load comprise a system on a chip.

* * * * *